US011206520B2

(12) United States Patent
Rochau et al.

(10) Patent No.: US 11,206,520 B2
(45) Date of Patent: Dec. 21, 2021

(54) METHOD FOR LINE-REPLACEABLE UNIT IDENTIFICATION, LOCALIZATION AND STATUS RETRIEVAL (71) Applicant: Systems and Software Enterprises, LLC, Brea, CA (US)

(72) Inventors: Andreas Rochau, Brea, CA (US); Christian Kissling, Brea, CA (US)

(73) Assignee: Safran Passenger Innovations, LLC, Brea, CA (US)

( * ) Notice: Subject to any disclaimer, the term of this patent is extended or adjusted under 35 U.S.C. 154(b) by 340 days.

(21) Appl. No.: 15/896,381

(22) Filed: Feb. 14, 2018

(65) Prior Publication Data
US 2018/0234825 A1  Aug. 16, 2018

Related U.S. Application Data (60) Provisional application No. 62/458,928, filed on Feb. 14, 2017.

(51) Int. Cl.
*H04W 4/80* (2018.01)
*H04L 29/08* (2006.01)
(Continued)

(52) U.S. Cl.
CPC .......... *H04W 4/80* (2018.02); *B64D 11/0015* (2013.01); *B64F 5/40* (2017.01); *H04L 43/08* (2013.01);
(Continued)

(58) Field of Classification Search
CPC .......... H04W 4/80; H04W 4/48; H04L 67/04; H04L 67/06; H04L 67/08;
(Continued)

(56) References Cited

U.S. PATENT DOCUMENTS 4,943,919 A * 7/1990 Aslin .................... G07C 5/006
340/500
6,813,777 B1 * 11/2004 Weinberger ........ H04B 7/18508
348/E5.008
(Continued)

FOREIGN PATENT DOCUMENTS

CN        105737804 A    7/2016
DE   10 2015 105 617 A1  10/2016
WO        2016165998 A1  10/2016

OTHER PUBLICATIONS

International Search Report and Written Opinion for PCT application No. PCT/US2018/018139 dated Jun. 1, 2018; 14 pgs.
(Continued)

*Primary Examiner* — Jinsong Hu
*Assistant Examiner* — Rui M Hu
(74) *Attorney, Agent, or Firm* — Umberg Zlpser LLP; Ryan Dean (57) ABSTRACT

Systems and methods are described for registering and monitoring a status of a plurality of units of an in-flight entertainment system disposed within a vehicle. Using a portable computing device, each of the units can be registered with the server by reading a unique machine-readable identifier disposed on or near each unit. The identifier could be a barcode or other indicia or a NFC tag, for example. Location information about each unit can also be obtained via manual input or by reading a second identifier.

17 Claims, 5 Drawing Sheets (51) Int. Cl.
*H04W 4/48* (2018.01)
*B64D 11/00* (2006.01)
*H04L 12/26* (2006.01)
*B64F 5/40* (2017.01)
*H04L 29/12* (2006.01)

(52) U.S. Cl.
CPC .............. *H04L 67/04* (2013.01); *H04L 67/12* (2013.01); *H04L 67/18* (2013.01); *H04W 4/48* (2018.02); *H04L 61/20* (2013.01); *H04L 61/609* (2013.01)

(58) Field of Classification Search
CPC ..... H04L 43/08–0817; B64D 11/0015–00155; G06K 7/10376–10475; G06Q 10/20
See application file for complete search history.

(56) References Cited

U.S. PATENT DOCUMENTS

| | | | |
|---|---|---|---|
| 8,806,521 B2 | 8/2014 | Keen et al. | |
| 8,981,967 B1* | 3/2015 | Shore | B64F 5/00 340/945 |
| 9,003,454 B2 | 4/2015 | Keen et al. | |
| 10,097,950 B2* | 10/2018 | Moyer | H04N 21/41422 |
| 2003/0187554 A1* | 10/2003 | Henry | G07C 5/085 701/29.6 |
| 2005/0044564 A1* | 2/2005 | Stopniewicz | H04N 21/41422 725/37 |
| 2005/0134461 A1* | 6/2005 | Gelbman | G06K 17/00 340/572.8 |
| 2006/0032979 A1* | 2/2006 | Mitchell | B64D 11/00155 244/118.6 |
| 2007/0266782 A1* | 11/2007 | Bartz | G06Q 10/087 73/156 |
| 2008/0023600 A1* | 1/2008 | Perlman | B60K 37/06 248/128 |
| 2008/0100450 A1* | 5/2008 | Ayyagari | B64D 25/18 340/572.7 |
| 2008/0145879 A1 | 6/2008 | Orenga et al. | |
| 2009/0081947 A1* | 3/2009 | Margis | H04N 21/41422 455/3.02 |
| 2010/0152962 A1* | 6/2010 | Bennett | G07C 5/0808 701/31.4 |
| 2010/0238001 A1* | 9/2010 | Veskovic | H05B 45/10 340/10.42 |
| 2011/0174926 A1* | 7/2011 | Margis | B60R 11/0229 244/118.6 |
| 2012/0053779 A1* | 3/2012 | Fischer | H04W 4/026 701/29.6 |
| 2012/0259587 A1* | 10/2012 | Sannino | G07C 5/0808 702/185 |
| 2012/0262292 A1 | 10/2012 | Moser | |
| 2012/0306666 A1* | 12/2012 | Xu | B64F 5/60 340/945 |
| 2013/0097274 A1 | 4/2013 | Moss | |
| 2014/0282727 A1* | 9/2014 | Keen | H04N 21/4126 725/37 |
| 2015/0017915 A1 | 1/2015 | Hennequin et al. | |
| 2015/0170307 A1* | 6/2015 | Hunt | G06K 19/06037 235/380 |
| 2016/0071331 A1 | 3/2016 | Angus et al. | |
| 2016/0127334 A1 | 5/2016 | Bangole et al. | |
| 2016/0275769 A1* | 9/2016 | McIntosh | G08B 13/2451 |
| 2016/0311348 A1 | 10/2016 | Watson et al. | |
| 2016/0314328 A1* | 10/2016 | Hosamane | G06K 7/10376 |
| 2106/0335038 | 11/2016 | Choi et al. | |
| 2017/0182957 A1* | 6/2017 | Watson | G08C 17/02 |
| 2017/0206417 A1* | 7/2017 | Aoyama | G06K 9/00255 |
| 2018/0049250 A1* | 2/2018 | Perng | H04L 67/34 |
| 2018/0150664 A1* | 5/2018 | Pattar | G06K 7/10376 |
| 2018/0234823 A1* | 8/2018 | Rochau | H04W 4/42 |
| 2019/0031366 A1* | 1/2019 | Lauer | H04B 5/0037 |

OTHER PUBLICATIONS

European Patent Office, Extended European Search Report, dated Sep. 29, 2020.

* cited by examiner

METHOD FOR LINE-REPLACEABLE UNIT IDENTIFICATION, LOCALIZATION AND STATUS RETRIEVAL

This application claims priority to U.S. provisional application Ser. No. 62/458,928 filed on Feb. 14, 2017. This and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

The field of the invention is in-flight entertainment technologies.

BACKGROUND

The following description includes information that may be useful in understanding the present invention. It is not an admission that any of the information provided herein is prior art or relevant to the presently claimed invention, or that any publication specifically or implicitly referenced is prior art.

As the price for displays and computing technology has decreased, in-flight entertainment systems have included devices or line-replaceable units (LRUs) disposed at each seat back or other location (e.g., Overhead Display Units (ODUs), Seat Display Units (SDUs), monument displays, broadcast display or similar), rather than at a few central locations, for example.

The increased number of units presents new challenges including, for example, locating and registering each unit with the in-flight entertainment system. This is especially true for LRUs which may be replaced by airline crew in-flight or while the vehicle is on the ground.

Thus, there is still a need for quickly and easily locating and registering line-replaceable units in an aircraft or other vehicle.

SUMMARY OF THE INVENTION

The inventive subject matter provides apparatus, systems and methods that advantageously allow for (1) wireless identification of an LRU for configuration; (2) wireless registration of an LRU at a maintenance or controlling server; (3) mapping of an LRU to a position in the aircraft/registration of LRU location at a server; (4) direct and automatic maintenance interaction with a LRU without cables; and (5) direct readout of BITE (Built-In Test Equipment) information from an LRU without need of a server unit or cable.

Preferred systems and methods utilize a server and a plurality of in-flight entertainment units (also referred to herein as a "line replaceable unit" or "LRU") disposed with an aircraft. It should be noted that the description of the inventive subject matter contained herein references an aircraft. However, it is contemplated that the system and methods can be applied to other vehicles such as train cars, busses, or other multi-passenger vehicles or enclosed environments where wireless bandwidth is similarly limited.

Optionally, registration can further include providing a location of the unit in the aircraft or other vehicle to the system. For example, this can be important to distinguish the content to be available to the unit where content shall be shown only to certain parts of the aircraft (e.g., First Class, Business Class, Premium Economy Class, Economy Class or similar). The location can also be used where the unit communicates wirelessly with the in-flight entertainment system to help ensure the unit connects with the closest wireless access point, for example.

Additionally, the units may need to be configured and monitored live during maintenance, such that maintenance personnel have an easy possibility to select the display unit that needs to be configured, maintained, monitored or controlled.

Various objects, features, aspects and advantages of the inventive subject matter will become more apparent from the following detailed description of preferred embodiments, along with the accompanying drawing figures in which like numerals represent like components.

DETAILED DESCRIPTION

It should be noted that any language directed to a computer should be read to include any suitable combination of computing devices, including servers, interfaces, systems, databases, agents, peers, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

One should appreciate that the disclosed techniques provide many advantageous technical effects including allowing for quick registration and location of line-replaceable units in an aircraft cabin or other vehicle interior, including the ability to locate and register units in-flight or when replaceable a non-functioning unit.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Figure 1:
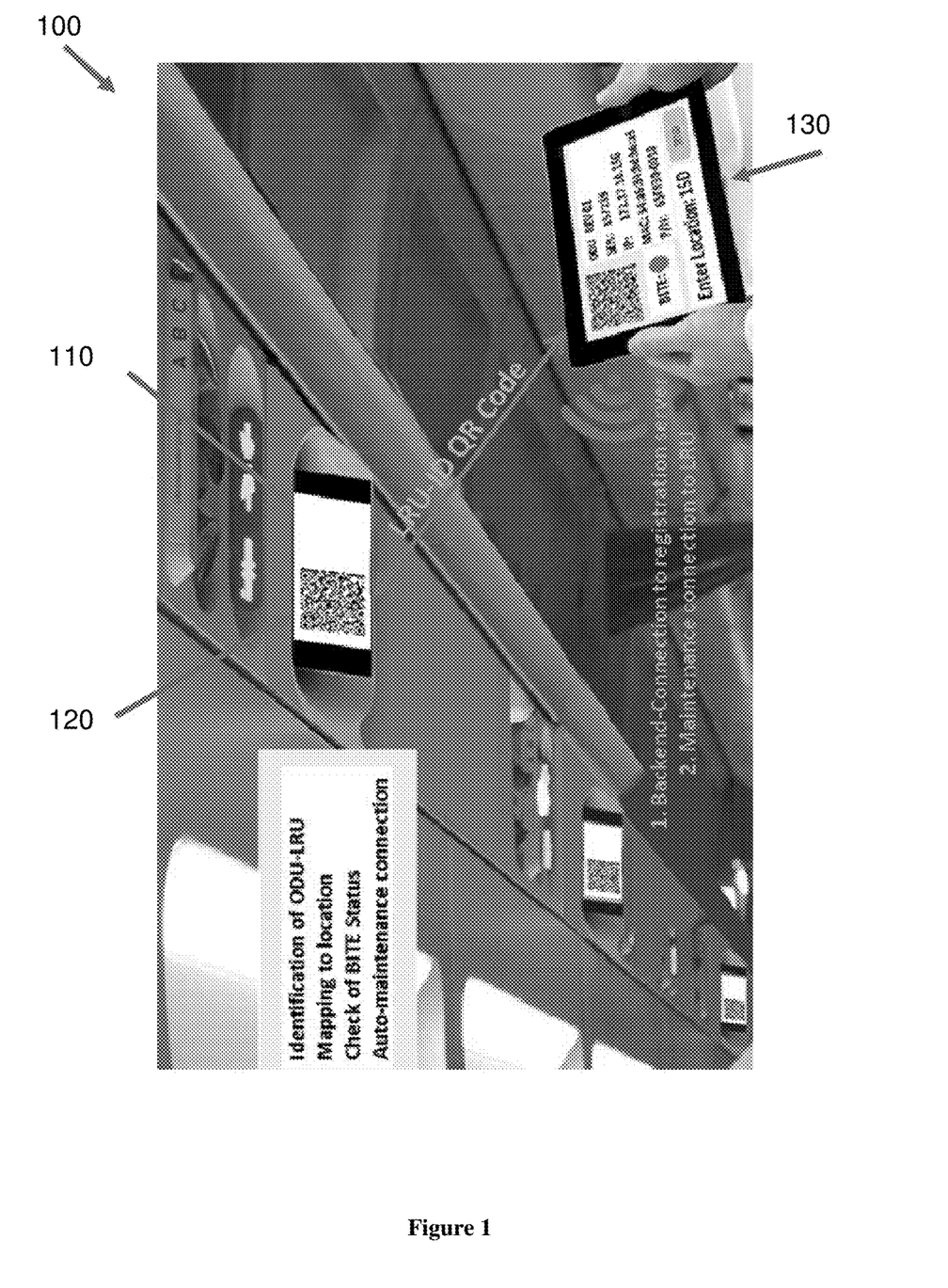
FIG. 1 provides an illustrative example of identifying an overhead display unit using the method of the inventive subject matter.

FIG. 1 illustrates one embodiment of a use of a system 100 for registration and maintenance of in-flight entertainment units 110. As shown in the figure, the display of each unit 110 can present a unique machine-readable identifier 120, which can include, for example, a two-dimensional Quick Response (QR) barcode or other indicia, a NFC sensor pad, an iBeacon, or other marker or commercially suitable indicia or technology that serves a similar purpose.

In some embodiments, the unit or LRU can comprise a memory, a processor, a wireless interface (e.g., Wi-Fi, cellular, etc.), and display screen for video playback. Contemplated LRUs can include entertainment units integrated into aircraft seats, such as in the seat-backs (this includes both self-contained seatback LRUs having all of the components within the seatback unit and also modular LRU systems where the display screen is integrated into the seatback but other components such as the storage, communication interfaces and/or processor(s) are located under the seat or in a separate part of the seat), and overhead display units ("ODUs"). In embodiments, the LRU can also include a short-rage wireless data communication interface capable of short-range data exchanges. Examples of short-range wireless interfaces include near-field communication interfaces, Bluetooth, and IR (infra-red). In embodiments, the LRU can include a wired connection interface (e.g., USB, HDMI, Thunderbolt, etc.) that can be connected to other computing devices for data exchange and/or power supply.

For units lacking a display, it is contemplated that the non-display units can comprise a machine-readable identifier which can include, for example, a printed 2-dimensional barcode on its casing, a NFC sensor pad, an iBeacon, or other commercially suitable indicia or technology.

A portable computing device 130 can act as reader/registrar, and could be, for example, a Tablet PC, a smart phone, or other portable computing device. The portable device 130 is preferably used to read the machine-readable identifier 120. For example, as shown in FIG. 1, the device 130 can capture or scan the QR code 120. Where the QR code is replaced with another identifier, it is contemplated that device 130 could be used to read the other indicia, NFC tag, or iBeacon, for example. The machine readable identifier contains information that allows for identification of the unit 110. Exemplary information can include, for example, one or more of LRU Serial Number, LRU IP address, LRU MAC address, and LRU part number.

As shown in FIG. 1, the portable computing device 130 preferably obtains this information by photographing or scanning the 2D barcode or other indicia, or reading the NFC or iBeacon. Once obtained, maintenance or other personnel can then enter the installation location of the unit 110 (e.g., seat 15D) and complement the information received from the barcode. The device 130 can then register the unit 110 together with its location at the server. The advantage of this process is that no access to a data interface, connectors or similar at the unit 110 is necessary and units (e.g., LRUs) can be rapidly and easily identified and configured. This is especially important during in-flight replacement of a non-functioning LRU, for example.

Figure 2:
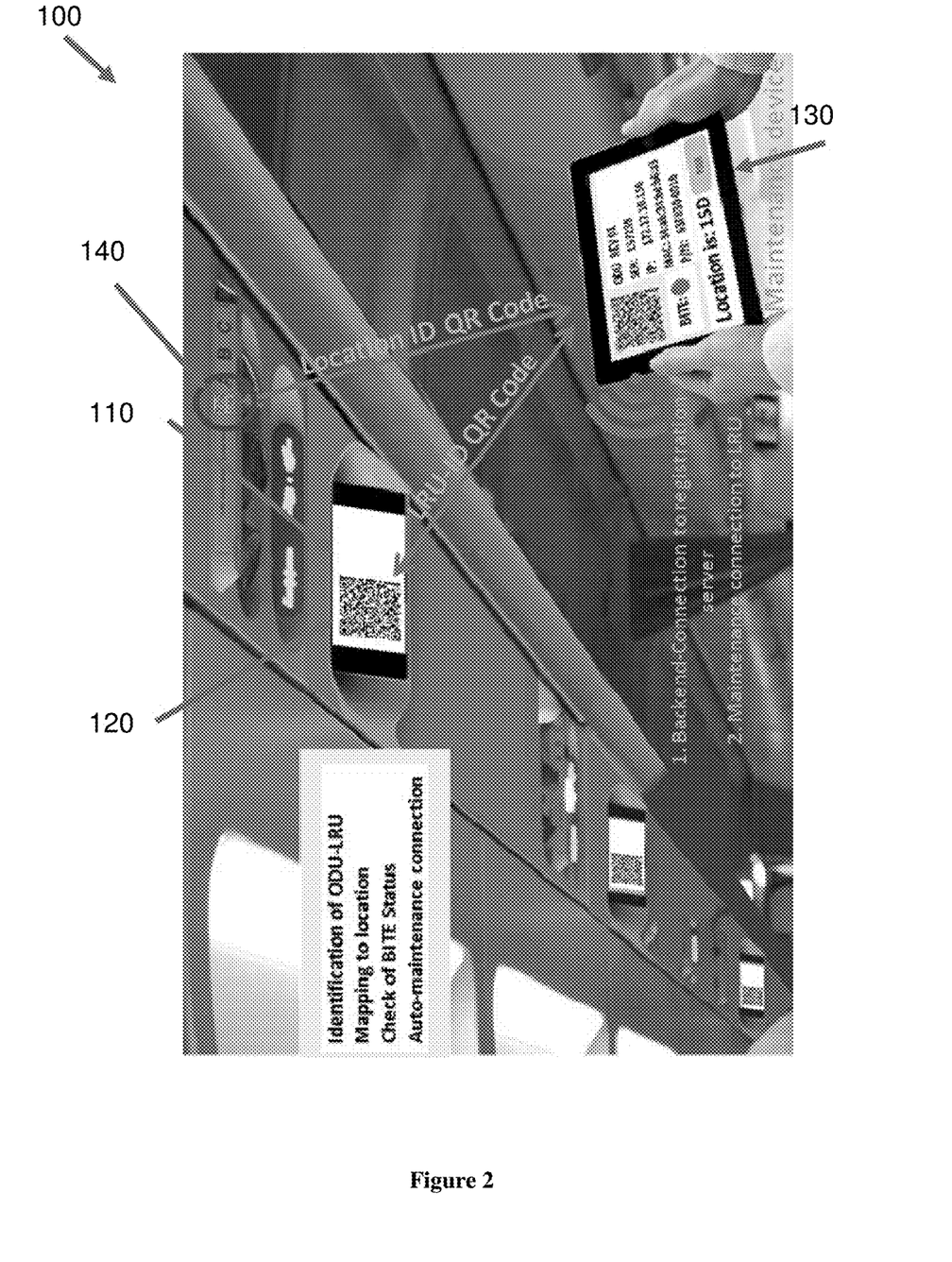
FIG. 2 provides an illustrative example of locating an overhead display unit using the method of the inventive subject matter.
Figure 3:
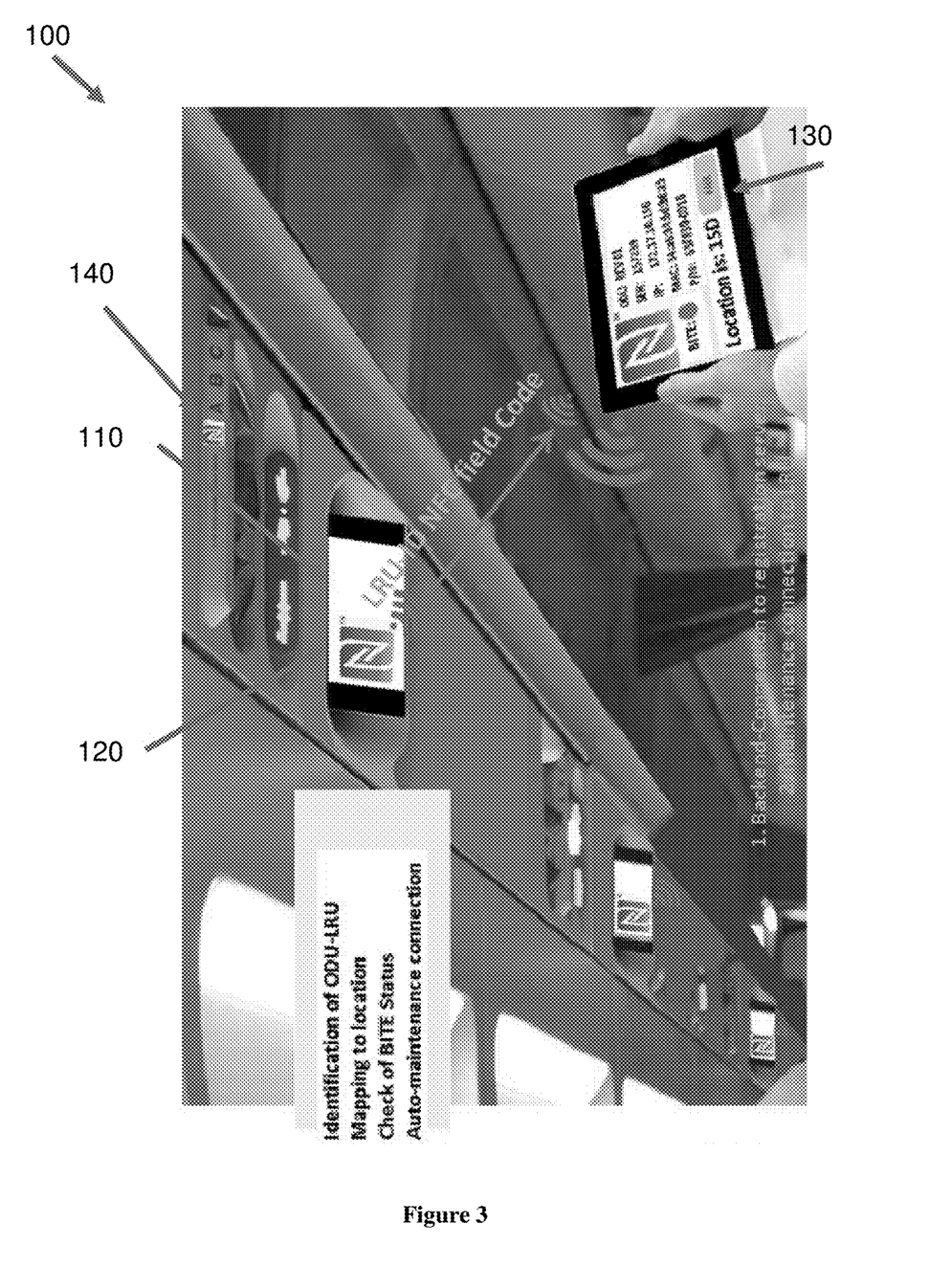
FIG. 3 provides an illustrative example of identifying an overhead display unit using a second method of the inventive subject matter.
Figure 4:
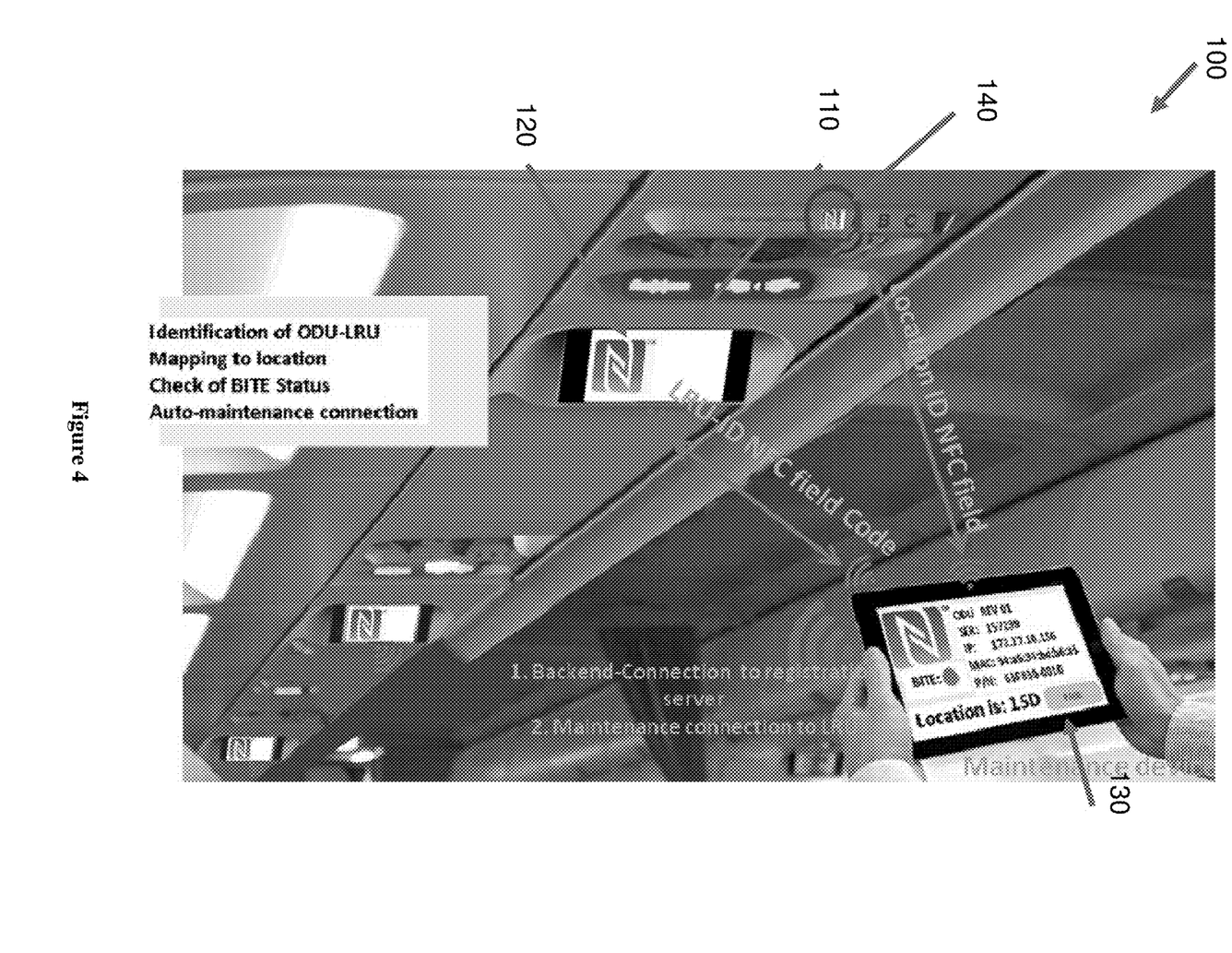
FIG. 4 provides an illustrative example of locating an overhead display unit using the second method of the inventive subject matter.

As an alternative to manually adding the installation location of unit 110, a second machine-readable marker 140 can be placed on the mounting frame of the unit 110 or other nearby location, such as shown in FIGS. 2 and 4. This second location marker 140 contains location information with respect to the aircraft or other vehicle, which could include a seat row number, for example, or a class of service of the vehicle. The reader device 130 can then read both machine-readable identifiers 120 and 140. For instance, it can scan both 2D barcodes, the one of the LRU and the one of the mounting frame where the LRU is installed, or read both NFCs or iBeacons, or combinations thereof. The reader device can then automatically map the location information from the frame with the device ID from the machine-readable marker at the LRU.

In either case, once the information is obtained, the tablet PC, smartphone, or other portable computing device 130 can transmit the combined information to the server in the aircraft which controls the unit 110. The server has then a detailed knowledge of which unit is installed in which location. It is contemplated that this process can be automated using a specialized application that is installed on the portable computing device 130.

If the unit 110 requires configuration directly during maintenance, for example, the maintenance personnel can scan the machine-readable marker 120 (e.g. scan the 2D QR code on the screen or read the NFC), and retrieve all information about the unit 110. This information can then be used, for example, using the actual IP address, the reader 130 can automatically connect to the unit 110 at which the maintenance person is examining. In this manner, the maintenance personnel can then be sure that it connects to the unit 110 currently being reviewed.

A similar principle can be used for LRUs that lack a display. In these cases the LRU can contain a sticker-label which contains static information about the LRU, such as for instance, serial number, part number, and MAC address. The maintenance app on the reader 130, for example, can then scan the barcode, and query the current IP address of the LRU from the server by submitting the identification information retrieved from the LRU. With this information, the reader 130 can then connect automatically to the LRU for carrying out maintenance, controlling, or monitoring tasks, for example.

It is further contemplated that LRUs having a display can include information on their Built-In Test Equipment (BITE) status into the machine readable marker, e.g. the 2D QR code, or the information sent over NFC or iBeacon. Advantageously, maintenance personal can then read the machine-readable marker on each LRU that shall be controlled. An app on the maintenance device (e.g. smartphone or tablet PC) can then display the BITE status to the maintenance crew for identification of LRU status, errors, etc.

Figure 5:
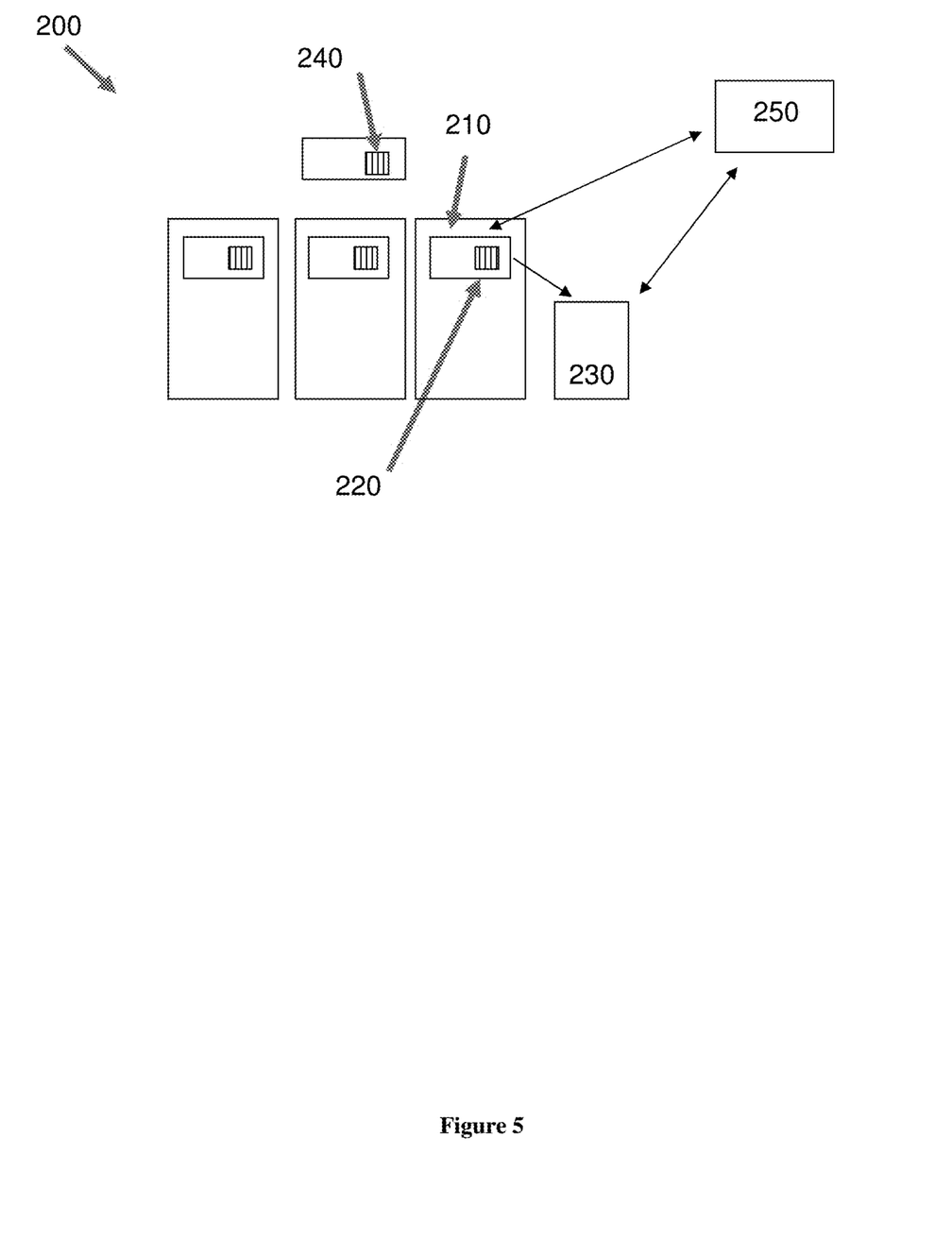
FIG. 5 illustrates one embodiment of a system for registering and monitoring a status of a plurality of line-replaceable units of an in-flight entertainment system.

FIG. 5 illustrates one embodiment of a system 200 for registering and monitoring a status of a plurality of line-replaceable or other units 210 of an in-flight entertainment system. As shown in the figure, each of the LRUs 210 can be disposed in individual seat backs, for example, although it is also contemplated that one or more LRUs could be coupled to an overhead compartment, a bulkhead, or other location.

A first LRU 210 can display a first machine-readable identifier 220. However, in alternative embodiments, the identifier 220 could be disposed adjacent to the LRU 210, such as on its casing or on the seat back near the LRU 210, for example. Where the identifier 220 comprises a NFC tag or other non-barcode, it is contemplated that an image may be displayed in place of identifier 220 to inform a staff member that the LRU 210 is ready to be read, although this is not required.

As discussed above, a portable computing device 230 can act as reader/registrar, and could be, for example, a Tablet PC, a smart phone, or other portable computing device. The portable device 230 is preferably used to read the machine-readable identifier 220, such as by scanning or reading identifier 220. The machine readable identifier 220 contains information that allows for identification of the unit 110, and also preferably comprises BITE status of the LRU 210. Exemplary information can include, for example, one or more of LRU Serial Number, LRU IP address, LRU MAC address, and LRU part number.

A second machine-readable marker 240 can be placed on the mounting frame of the unit 210 or other nearby location, such as at an overhead compartment as shown. This second location marker 240 preferably contains location information with respect to the aircraft or other vehicle, an may not be unique to a specific LRU, but rather a set of LRUs. The reader device 230 can then read both machine-readable identifiers 220 and 240. For instance, it can scan both 2D barcodes, the one of the LRU and the one of the mounting frame where the LRU is installed, or read both NFCs or iBeacons, or combinations thereof. The reader device can then automatically map the location information from the frame with the device ID from the machine-readable marker at the LRU.

The device 230 is configured to communicate with a server 250. For example, once identifying and location information is retrieved about the LRU 210, the first LRU 210 can be registered with the server 250 by transmitting some or all of the information from the first machine-readable identifier and location identifier to the server 250 from the portable computing device 230.

Server 250 can also be communicatively coupled with the first LRU 210, and can, for example, cause the first LRU to display an identifier during maintenance for example. In other embodiments, it is contemplated that a start-up routine of the LRU can include displaying the identifier until a signal is received from server 250 indicating that the LRU is registered with the server 250.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method for registering a plurality of line-replaceable units (LRUs) within a vehicle, wherein each LRU is associated with a unique machine-readable identifier disposed on or near the LRU, the method comprising:

reading a first machine-readable identifier from a first LRU of the plurality of LRUs using a portable computing device, wherein the first machine-readable identifier is displayed on or near the first LRU, and wherein the first machine-readable identifier comprises identification information that includes a built-in test equipment (BITE) status of the first LRU, and wherein the first machine-readable identifier is generated based on the BITE status and other identification information;

presenting the BITE status of the first LRU on a display screen of the portable computing device;

receiving a location identifier into the portable computing device comprising location information;

registering the first LRU with its location at a server by transmitting the identification information and the location information to the server from the portable computing device, wherein the server is communicatively coupled with the first LRU, and configuring the first LRU based on configuration information received at the first LRU from the server, wherein the configuration information is based on both the identification information and the location information received at the server from the portable computing device.

2. The method of claim 1, wherein the step of receiving the location identifier further comprises a user manually inputting a location of the first LRU into the portable computing device.

3. The method of claim 1, wherein the step of receiving the location identifier further comprises capturing a second machine-readable identifier that comprises location information using the portable computing device, wherein the second machine-readable identifier is disposed near the first LRU.

4. The method of claim 3, wherein the second machine-readable identifier is one of a set of machine-readable identifiers, each disposed at a different seat row of the vehicle.

5. The method of claim 1, wherein the first machine-readable identifier is presented on a display screen of the first LRU.

6. The method of claim 1, wherein the first machine-readable identifier is disposed on the casing of the first LRU.

7. The method of claim 1, wherein the first machine-readable identifier is disposed adjacent to the first LRU.

8. The method of claim 1, wherein the first machine-readable identifier comprises a barcode.

9. The method of claim 8, wherein the portable computing device comprises a camera configured to capture an image of the first machine-readable identifier.

10. The method of claim 1, wherein the first machine-readable identifier comprises a NFC tag.

11. The method of claim 1, wherein the first machine-readable identifier comprises an iBeacon.

12. The method of claim 1, wherein the portable computing device comprises a wireless receiver configured to receive a signal from the first LRU.

13. The method of claim 1, wherein the portable computing device comprises a smart phone, a smart watch, or a tablet PC.

14. The method of claim 1, wherein the first LRU comprises a processor, a wireless communication interface, and a display.

15. The method of claim 1, wherein the step of reading the first machine-readable identifier and receiving the location identifier utilizes a software application installed on the portable computing device.

16. The method of claim 1, wherein the identification information comprises at least one of a serial number, an IP address, a MAC address, and a part number of the LRU.

17. A method for monitoring a status of a plurality of line-replaceable units (LRUs) within a vehicle, wherein each LRU is associated with a unique machine-readable identifier disposed on or near the LRU, the method comprising:

providing a server communicatively coupled with a plurality of LRUs disposed within the vehicle, wherein each of the LRUs comprises a processor, a wireless communication interface, and a display screen;

generating a first machine-readable identifier based on BITE status and other information;

presenting the first machine-readable identifier on the display screen of a first LRU of the plurality of LRUs;

wherein the first machine-readable identifier comprises identification information specific to the first LRU that comprises at least one of a serial number, an IP address, a MAC address, and a part number of the LRU, and wherein the identification information further comprises a built-in test equipment (BITE) status of the first LRU; and reading the first machine-readable identifier from the first LRU using a portable computing device and presenting the BITE status of the first LRU on a display screen of the portable computing device.

* * * * *